(12) United States Patent
Kahn (10) Patent No.: US 8,532,293 B2
(45) Date of Patent: Sep. 10, 2013

(54) METHOD AND SYSTEM FOR SECURELY PROVIDING AND STORING CONTENT IN A MULTIPLE DWELLING UNIT SYSTEM

(75) Inventor: Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 876 days.

(21) Appl. No.: 11/863,041

(22) Filed: Sep. 27, 2007

(65) Prior Publication Data

US 2009/0086970 A1    Apr. 2, 2009

(51) Int. Cl.
*H04N 7/167* (2011.01)

(52) U.S. Cl.
USPC .............. 380/239; 380/28; 380/31; 380/33; 713/153; 713/168

(58) Field of Classification Search
USPC .............................................. 380/239
See application file for complete search history.

(56) References Cited

U.S. PATENT DOCUMENTS

| | | | |
|---|---|---|---|
| 5,812,671 | A | 9/1998 | Ross, Jr. |
| 6,275,990 | B1 | 8/2001 | Dapper et al. |
| 6,961,858 | B2 | 11/2005 | Fransdonk |
| 7,162,642 | B2 | 1/2007 | Schumann et al. |
| 7,203,314 | B1 | 4/2007 | Kahn et al. |
| 7,489,780 | B2 | 2/2009 | Dellow et al. |
| 7,676,040 | B2 | 3/2010 | Augenstein et al. |
| 7,690,022 | B2 | 3/2010 | Basawapatna et al. |
| 8,266,657 | B2 | 9/2012 | Margulis |
| 2003/0030720 | A1 | 2/2003 | Hutchings |
| 2004/0125957 | A1* | 7/2004 | Rauber et al. ............... 380/259 |
| 2004/0143839 | A1 | 7/2004 | Gonzales-Caiazzo et al. |
| 2004/0268408 | A1* | 12/2004 | Lee et al. ..................... 725/116 |
| 2005/0028191 | A1 | 2/2005 | Sullivan et al. |
| 2005/0169473 | A1* | 8/2005 | Candelore ................... 380/239 |
| 2007/0124602 | A1 | 5/2007 | Wald et al. |
| 2007/0234084 | A1* | 10/2007 | Furuta ......................... 713/300 |
| 2007/0266409 | A1* | 11/2007 | Hsu ............................... 725/78 |
| 2008/0120635 | A1 | 5/2008 | Trimper et al. |
| 2009/0320058 | A1 | 12/2009 | Wehmeyer et al. |

FOREIGN PATENT DOCUMENTS

WO    2006107350 A1    10/2006

OTHER PUBLICATIONS

Non-final Office action dated Jul. 21, 2010 in U.S. Appl. No. 11/862,883, filed Sep. 27, 2007, by Raynold M. Kahn.
Final Rejection dated Jan. 4, 2011 in U.S. Appl. No. 11/862,883, filed Sep. 27, 2007, by Raynold M. Kahn.
Non-final Office action dated Dec. 22, 2010 in U.S. Appl. No. 11/862,981, filed Sep. 27, 2007, by Peter M. Klauss et al.
Final Rejection dated Feb. 2, 2012 in U.S. Appl. No. 11/862,981, filed Sep. 27, 2007, by Peter M. Klauss et al.

\* cited by examiner

*Primary Examiner* — Shewaye Gelagay (57) ABSTRACT

A communication system 10 includes a head end 12. The head end communicates with a system gateway 26. A plurality of user devices 28 is coupled to the gateway 26 that includes a memory device 94 for storing content therein. The gateway 26 receives the plurality of first encrypted signals and stores the signals in the memory device 94. The storing in the memory device 94 may be performed after further encryption. One of the user devices 28 generates a request for content and communicates the request to the gateway 26. The gateway 26 communicates content corresponding to the request to the user device 28.

24 Claims, 7 Drawing Sheets

METHOD AND SYSTEM FOR SECURELY PROVIDING AND STORING CONTENT IN A MULTIPLE DWELLING UNIT SYSTEM

TECHNICAL FIELD

The present disclosure relates to a content delivery system and, more specifically, to a system that redistributes content to various devices within a building such as a multiple dwelling unit from a gateway on or within the building using encryption and includes a central memory device for storing content for all users.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription and pay-per-view access to the broadcast content. Access is provided using signals broadcast over the satellite. Once access is provided the user can access the particular content.

It may be desirable to provide satellite television to various users in a building such as a multiple dwelling unit (MDU) such as an apartment building, office building, hotel or hospital. However providing antennas and the associated hardware for each unit on an individual basis is not cost effective and may consume a large portion of the building. This may not be aesthetically pleasing as well. Providing content to a large number of consumers in a particular building must be done in a secure manner.

In systems for individual users, set top boxes often include a digital video recorder for recording video. The digital video recorder may be embodied in a hard drive. Providing a digital video recorder increases the cost of a system. Providing a video recorder for each unit or television may substantially increase the cost of providing a system.

SUMMARY

The present invention allows content to be distributed throughout a building using a gateway. Authorizations may be obtained through many types of communication means including through a satellite. The system provides a memory device in a central location to allow the memory device to be shared by each user.

In one aspect of the disclosure, a method of operating a communication system includes communicating content signals to a gateway, storing the content signals in a memory associated with a gateway, generating a request for content from a first user device from a plurality of user devices to the gateway and communicating a first content signal to the first user device from the memory in response to the request.

In another aspect of the disclosure, a method of operating a communication system includes encrypting a plurality of signals with a broadcast encryption to form a plurality of encrypted signals, communicating the plurality of encrypted signals to a system gateway, storing the encrypted signals in a memory device at the gateway, generating a request for content for a first signal of the plurality of encrypted signals stored on the storage device from a first user device of the plurality of user devices, communicating the first signal to the first user device from the storage device and decrypting the first signal at the user device to form unencrypted signals.

In yet another aspect of the disclosure, a method of operating a communication system includes encrypting a plurality of signals with a first encryption to form a plurality of first encrypted signals, communicating the plurality of first encrypted signals to a gateway, decrypting the plurality of first encrypted signals at the gateway to form a plurality of unencrypted signals, encrypting the unencrypted signals at the gateway with a second encryption to form a plurality of second encrypted signals, storing the plurality of second encrypted signals in a memory device at the gateway, requesting a first signal of the plurality of second encrypted signals stored on the storage device from a first user device of the plurality of user devices, communicating the first signal to the first user device and decrypting the first signal at the user device to form unencrypted signals.

In still a further aspect of this disclosure, a communication system includes a head end generating a plurality of content signals, a plurality of user devices, and a system gateway in communication with the head end and the plurality of user devices. The system gateway includes a memory device. The gateway receives the plurality of signals and stores the plurality of content signals in the memory device. A first user device of the plurality of devices generates a request for content to the gateway. The gateway communicates a first content signal to the first user device from the memory in response to the request.

In another aspect of the invention, a communication system includes a head end encrypting a plurality of signals with a broadcast encryption to form a plurality of encrypted signals. The system also includes a first device of a plurality of user devices generating a request for content for a first signal of the plurality of encrypted signals. The system also includes a system gateway in communication with the head end and the plurality of user devices, said system gateway comprising a memory device. The gateway receives the plurality of encrypted signals and stores the encrypted signals in a memory device. The gateway communicates the first signal to the first user device from the storage device in response to the request for content. The first user device receives the first signal from the gateway which decrypts the first signal.

In another aspect of the invention, a communication system includes a head end encrypting a plurality of signals with a first encryption to form a plurality of first encrypted signals. The system also includes a first device of a plurality of user devices generating a request for content for a first signal of the plurality of encrypted signals. The system also includes a system gateway in communication with the head end and the plurality of user devices. The system gateway includes a memory device. The gateway receives the plurality of first encrypted signals, decrypts the plurality of first encrypted signals to form a plurality of unencrypted signals and encrypts the unencrypted signals with a second encryption to form a plurality of second encrypted signals and stores the second encrypted signals in a memory device.

To enhance security in the system, some embodiments include various types of encryption information at various times. By providing a central memory device the overall download and storage of content within the overall system is reduced. This reduces the download burden of the gateway.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present patent.

Further, while the following disclosure is made with respect to the delivery of content (e.g., television (TV), movies, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Figure 1:
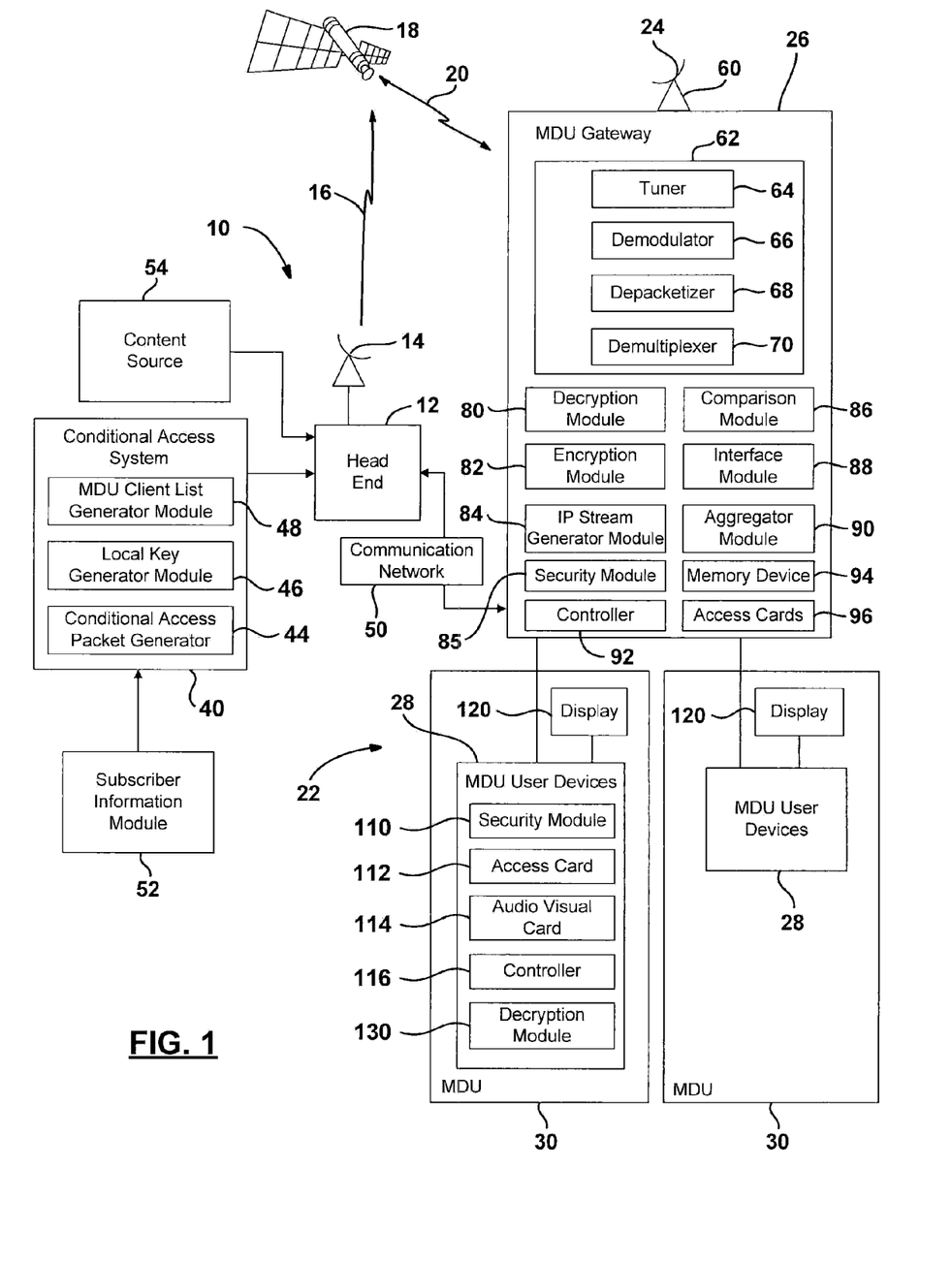
FIG. 1 is a block diagrammatic illustration of a content delivery system according to the disclosure.

As illustrated in FIG. 1, a communication system 10 includes a head end 12 that is coupled to an uplink antenna 14. The head end 12 may be used for many things, including multiplexing, modulating and uplinking signals 16 to satellite 18. It should be noted that satellite 18 may comprise a number of satellites operating in a system. The satellite 18 is used to generate downlink signals 20 to a multiple dwelling unit (MDU) delivery system 22, and, more specifically, to an antenna 24 of the multiple dwelling unit (MDU) delivery system 22. The multiple dwelling unit (MDU) delivery system 22 may include a gateway 26 that is used to receive signals from the satellite and distribute the signals to various client or user devices 28 that also constitute part of the MDU delivery system 22. Multiple dwelling unit (MDU) delivery system 22 may also be used to process the received satellite signals. The user devices 28 may be referred to as a set top box, a satellite set top box, or an integrated receiver decoder. Two user devices 28 are illustrated in FIG. 1. Many user devices 28 may be used in one MDU with each configured in a similar or the same manner. The wireless communications between the head end 12 and the multiple dwelling unit (MDU) delivery system 22 may take place at any suitable frequency such as Ka band and/or Ku band frequencies. Information signals may also be communicated from the multiple dwelling unit (MDU) delivery system 22 to the head end 12 through the satellite 18. The delivery system 22 may use Internet protocol to delivery the content therein. Each user device and the gateway may have an IP address assigned thereto and use the respective IP addresses to communicate.

The multiple dwelling unit delivery system 22 includes a multiple dwelling unit 30. The multiple dwelling unit 30 may comprise various types of buildings in which multiple user devices are coupled to a gateway. Examples of such buildings include, but are not limited to, an apartment building, condominium, office building, hotel or hospital. The service gateway 26 is associated with the particular MDU 30. One or more gateways 26 may be provided. The gateway or at least the antenna 24 may be mounted to an outer roof structure or wall. The various modules of the gateway 26 may be disposed within the MDU 30. The gateway 26 may be wired or wirelessly connected to the user devices 28.

Various types of content and security information signals including but not limited to security information, encryption-decryption information, digital rights management information, purchase information packets (PIPs), conditional access packets (CAPs), channel or content access lists or rights may be communicated through the communication system 10. It should also be noted that various content may be encrypted based upon a control word (CW) known to the head end 12 and known to the various user devices and/or to the MDU gateway 26 and/or multiple dwelling unit (MDU) delivery system 22 authorized to view and/or play back the content. The control word packets (CWPs) may include, among other things, a time stamp, authorization requirements and an input value for generating the control word. Control word packets may from time to time be transmitted to the satellite to the MDU gateway 26.

The multiple dwelling unit (MDU) delivery system 22 may also communicate to the head end 12 through a communication network 50. The communication network 50 may include various types of communication, including but not limited to a telephone-type communication link, an Internet-type communication link, a fiber optic communication link, a wired terrestrial communication link, a terrestrial wireless or cellular link. The communications through the communication network 50 may include content signals into the MDU delivery system 22. The communication network 50 may replace the satellite 18. The MDU delivery system 22 may also transmit call back information such as program and pay-per-view requests and reportback, interactive television signals and gaming signals.

A conditional access system 40 may be coupled to or be part of the head end 12. The conditional access system 40 includes a permission packet generator such as a conditional access packet generator 44 and a local key generator module 46. A MDU client list generator module 48 may also be included within the conditional access system 40. The MDU client list generator module 48 may generate a user list in response to information from a subscriber information module 52. The signals from the conditional access system 40 are communicated to the head end 12 where the signals are broadcast to the (MDU) delivery system 22.

The subscriber information module 52 receives or collects information regarding the permissions of the various users. The information may take the form of a user list that includes channel or content permission authorizations for each of the various users. The users may be identified in various manners including using an IP address. The IP address may be specific to the MDU delivery system. That is, both the MDU delivery system 22 and/or the MDU gateway 26 and the user device 28 may be identified in the user list. Security information such as encryption or decryption information may also be in the user list. The security information may include but is not limited to local key information.

A content source 54 may include a content delivery network, a content repository having contents received from a content provider or providers. The content may be various types of content including video, audio, games, data, or the like. A number of different content providers may be used to provide various types of content to the content source 54. The content source 54 may be coupled to the head end 12 to provide conventional satellite television service. The contents of the content source 54 may be provided in various ways including through a fiber optic network, satellite, telephone line, tapes, or DVDs.

Referring back to the multiple dwelling unit (MDU) delivery system 22, the gateway receiving antenna 24 receives signals that may include modulated multiplexed bit stream signals from the satellite 18. A separate antenna may be required for terrestrial communications. The received antenna signals are coupled from a reflector and a feed to a low noise block (LNB) 60 which amplifies and frequency-down converts the receive signals. The output of the LNB 60 is provided to a receiver 62 that receives the signals and may include a tuner 64, demodulator 66, a depacketizer 68, and a demultiplexer 70. The gateway receiver 62 may also receive and process signals from the communication network 50.

The gateway 26 may also include a decryption module 80 that is used for decrypting the incoming content signals from the communication network 50 or the satellite 18. As will be further described below, the decryption module 80 may provide conventional satellite broadcast decryption. The decryption module 80 is an optional module for the system. The decryption module 80 may not be required at the gateway 26 if the individual user devices 28 perform the satellite broadcast decryption.

An encryption module 82 may also be provided within the gateway 26. The encryption module 82 may be used to re-encrypt or super-encrypt the signals received from the communication network 50 or the satellite 18. Re-encryption is provided when encrypted signals are first decrypted, while super-encryption is provided when encrypted signals are again encrypted with a local key. The encryption module 82, whether re-encrypting or super-encrypting, may use a local key. The encryption module 82 is an optional module for the system. The encryption module 82 may not be required if neither re-encryption nor super-encryption is provided at the gateway 26.

An access card or access cards 96 may also be included in the gateway 26. The access cards 96 may be used to generate control words for decrypting the incoming signals. The control words provide access to authorized content and channels. The access cards 96 may also be referred to as smart cards. A number of access cards 96 may be used to generate control words and thereby provide access to various channels, groups of channels or various content. The control words may also be encrypted by the access cards 96 to form encrypted control words. The control words or the encrypted control words may be provided to the decryption module 82 at the gateway or may be transmitted to the user devices 28 to perform decryption. Different combinations of decryption and encryption will be described below.

A security module 85 may also be provided within the gateway 26. The security module 85 may receive control words from the access cards 96 and may provide the control words to the decryption module 80 for decrypting the incoming signals. The security module 85 may also provide local keys to the encryption module 82 for re-encrypting or super-encrypting the signals.

An IP stream generator module 84 may be used to generate an IP stream of the various channels or content received from the communication network 50 or satellite 18. The IP stream may broadcast signals to all user devices or target specific devices using the associated IP address.

A comparison module 86 may be used to compare a received list that is generated at the client list generator module 48 of the conditional access system 40 with a request from a user device 28. As will be mentioned below, the comparison module may provide access to a channel or content if the user device 28 is subscribed to the particular channel or content based upon the list.

An interface module 88 may be used to interface to the communication network 50. The interface module may transmit or receive information or signals from the communication network 50. The interface module 88 may format or reformat the material so it is suitable for communication using the particular medium.

An aggregator module 90 may also be included in the gateway 26. The aggregator module 90 may receive signals from the various user devices 28, collect them and form one consolidated communication signal through the communication network 50 or the satellite 18 to communicate the signals to the head end 12. The gateway 26 may also include a controller 92 for controlling various operations within the gateway 26. The controller 92 may be microprocessor-based. The various modules within the gateway 26 may also be incorporated in software within a controller 92.

The gateway 26 may also include a memory device 94. The memory device 94 may be physically within, associated with, or coupled to the gateway 26. The memory device 94 may include one memory device or a plurality of memory devices. The memory device may be implemented in a hard drive, flash memory or other types of memory. What is important is that the memory is associated with and accessible through the gateway by the various user devices 28. Thus, each user device 28 does not need its own individual memory device. This may result in a cost savings in implementing the overall system since redundant material needs to be only saved once in the memory device 94.

The user devices 28 communicate with the gateway 26. The gateway 26 and the user devices 28 may form a network such as a wired network or a wireless network. The gateway 26 communicates various content or channels or security information signals to each user device through the network. Each user device 28 may include a decryption module 130, a security module 110, an access card 112, a controller 116 and an audio-visual card 114. The audio-visual card 114 may include various functions including a tuner function, a demodulator function, a packetizer function, and a multiplexer function in much the same way as the receiver card 62 illustrated in the gateway 26.

The user device 28 may also be associated with or include a display 120. The display 120 may include a television or other monitor-type device.

The decryption module 130 may be used to decrypt the signals from the gateway 26. Also, as mentioned above, the receive signals may not be decrypted at the gateway 26 and, thus, the module 130 may be used to decrypt the signals as they were transmitted from the satellite. Also, the decryption module 130 may provide double decryption to decrypt the super-encrypted signals. That is, the decryption module 130 may use a local key to, first, decrypt the signals to the condition the signals were received from the satellite. The decryption module 130 may then use another decryption key to second decrypt the signals as they were transmitted through the satellite system. That is, the control word generated at the access cards may be received and used to decrypt the broadcast signals. The access card 112 may be used to generate control words to perform decryption of the broadcast signal. Typical satellite television systems include an access card or conditional access card.

A security module 110 may also be provided within the user device 28. The security module 110 may receive the local keys from the gateway 26 and provide the local keys to the decryption module 130 for the first decryption of the re-encrypted or super-encrypted signals. The security module 110 may also receive the control words from the access card 112 and provide the control words to the decryption module 130 for the second decryption corresponding to broadcast decryption of the original satellite signals.

The security modules 85 and 110 may share secret keys or algorithms with the access cards 96 and/or 112 to allow secure delivery of the control words, where the access cards may encrypt the control words and the security modules may decrypt the control words. The security module 85 at the gateway 26 may also share secret keys or algorithms with the security modules 110 at the user devices 28 for secure delivery of the local keys from the gateway 26 to the user devices 28. The security module 85 at the gateway 26 may encrypt the local keys, and the security modules 110 at the user devices 28 may decrypt the encrypted local keys. Encrypted local keys may also be delivered from the head end 12 to the gateway 26 via the satellite 18 or the communication network 50, and decrypted by the security modules 85 and 110. The gateway 26 may also generate random values that are used as encrypted local keys which are delivered to the user devices 28, and are decrypted by the security modules 85 and 110 to obtain the shared local keys.

As mentioned above, a network may be formed between the user devices 28 and the gateway 26. That is, the gateway 26 may include an Internet protocol address. Each user device 28 may also include an Internet protocol address. The Internet protocol address may be compared in the comparison module as an identifier for comparison with the channel authorizations provided in a list of authorized channels or content in the gateway.

Figure 2:
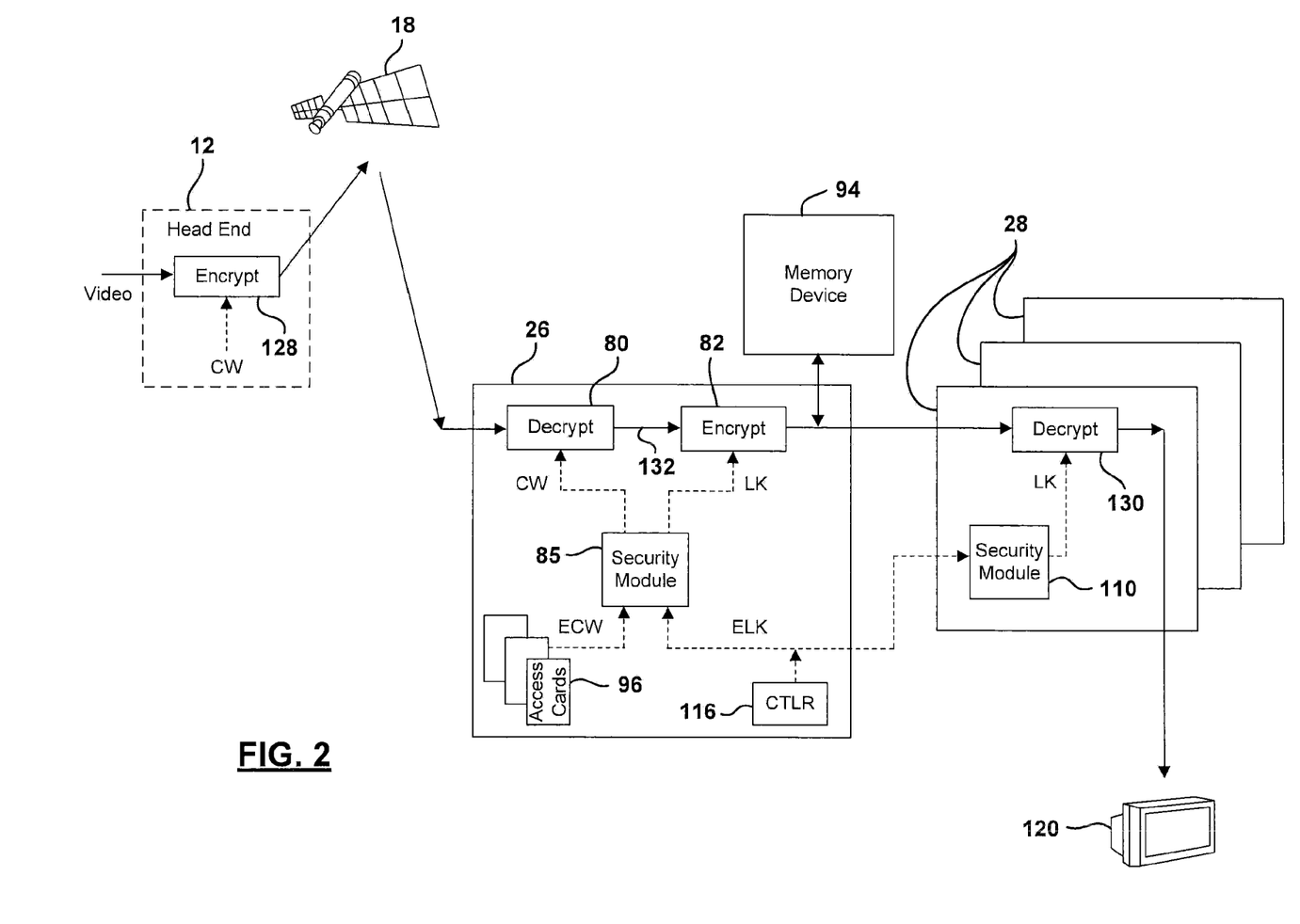
FIG. 2 is a simplified block diagrammatic illustration of a first example of a content delivery system.

Referring now to FIG. 2, a simplified block diagrammatic view of a first embodiment is illustrated. In this embodiment, a separate encryption module 128 is illustrated in the head end 12. The encryption module 128 receives audio-video signals and control words (CW) and encrypts the audio-video packets using the control words. The headend transmits the control words as control word packets and the audio-video signals as audio-video packets through satellite 18 to the gateway 26. In this embodiment, the gateway 26 may act as an SMATV server. Applications for this embodiment include hotels or hospitals where a specific selection of channels is available for any client to select and view. This embodiment allows users to "catch-up" to the video playing on any particular channel.

Access cards 96 in the gateway 26 are used to generate the control word (CWs) from the control word packets. These control words may only be obtained by access cards 96 that are authorized for the desired channels or content. The access cards 96 further encrypt these control words to form encrypted control words (ECWs). The gateway 26 includes a decryption module 80, an encryption module 82, and security module 85. The security module 85 decrypts the encrypted control words and provides control words to decryption module 80 so that decryption may take place of the broadcast signal. The decrypted signals 132 are provided to the encryption module 82. A local key is provided from the security module 85 to the encryption module 82 so that the unencrypted signals are re-encrypted using the local key. The local key may also be transmitted to the security module 110 in the user device 28. The security module 110 receives the encrypted local key from the controller 116 and security module 85 in the gateway 26 and provides a local key to the decryption module 130 at each of the user devices 28. The encrypted signals that are encrypted with the local key may be stored in the memory device 94 and accessed by the individual users. The individual user devices 28 may generate a request for content to the gateway 26 to receive the signals in the memory device corresponding to the encrypted signals. The memory device 94 may act as a buffer or as a catch-up means to catch up to an earlier time or start over at the beginning of a current program. Thus, each of the users has the flexibility of a digital video recording device without each individually having one.

Figure 3:
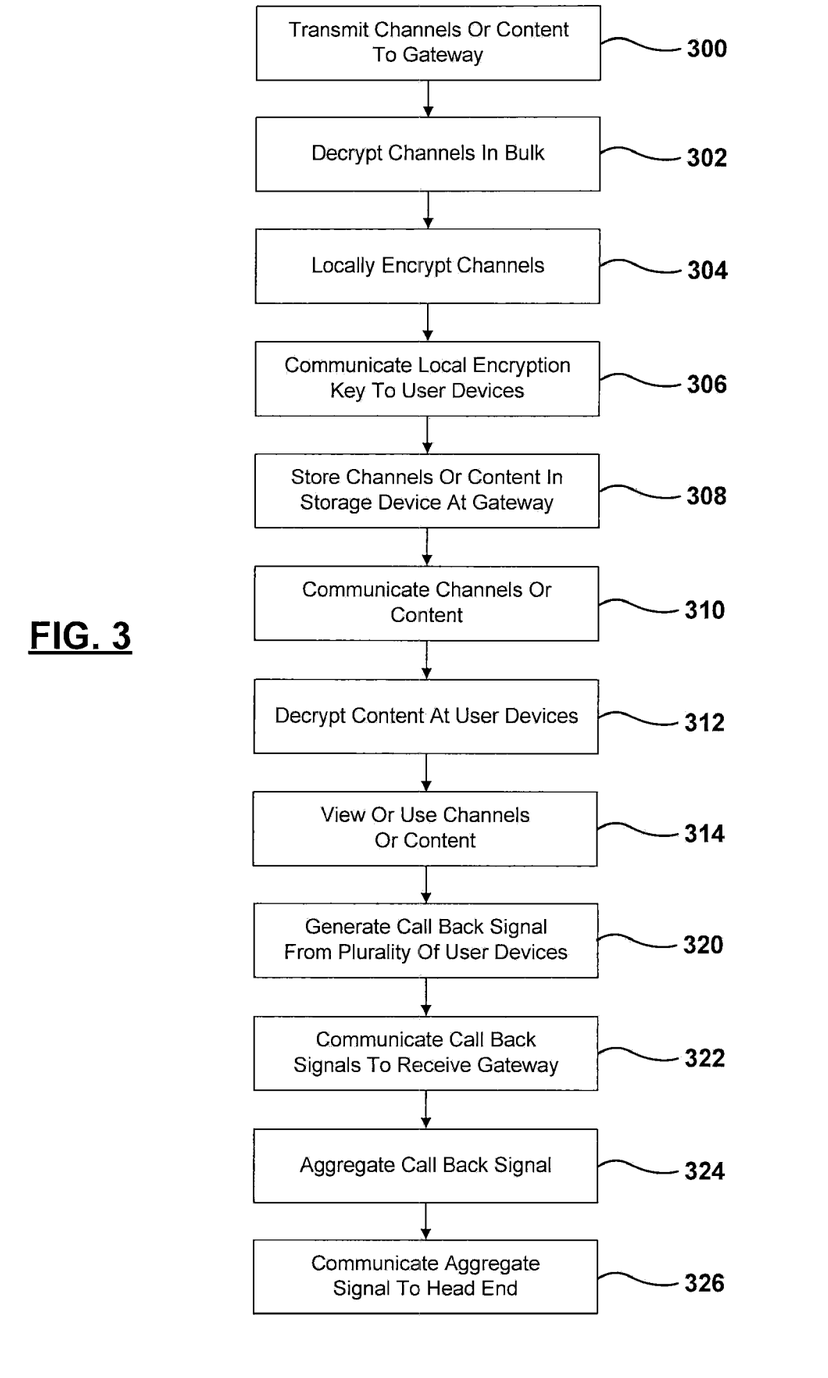
FIG. 3 is a flowchart of a first example for a method of operating the present disclosure.

Referring now also to FIG. 3, a method for operating the first embodiment is illustrated.

In step 300, the channels are transmitted to a gateway from the head end with broadcast encryption. In step 302, the channels may be decrypted in bulk at the gateway. In step 304, the channels or content may be locally encrypted. The local encryption may take place in the gateway using local keys as described above. In step 306, the local encryption key is communicated to the user devices. The local keys may be encrypted as described above. In step 308, the channels or content of the re-encrypted signals are stored in the memory device 94. In step 310, the various channels or content may be communicated to the user devices in response to a request for content from a first user. In step 312, the content is decrypted at the first user device. In step 314, the channel or content may be viewed at the user device requesting the content. It should be noted that various user devices such as a first user device and a second user device may request different content or the same content. If it is the same content, the content may be played back at different times. Thus, two devices may not receive exactly the same part of the program even though both are watching the same program or content.

The user devices may also generate call back signals that are to be transmitted to the head end. These call back signals may perform various functions including providing video-on-demand requests, pay-per-view requests, or various interactive services.

In step 320, call back signals may be generated from the plurality of user devices. In step 322, the call back signals are communicated to the service gateway. In step 324, the call back signals may be aggregated at the gateway. In step 326, the aggregate signal is communicated to the head end. The aggregate signal may be communicated over the satellite or communicated over the communication network.

Figure 4:
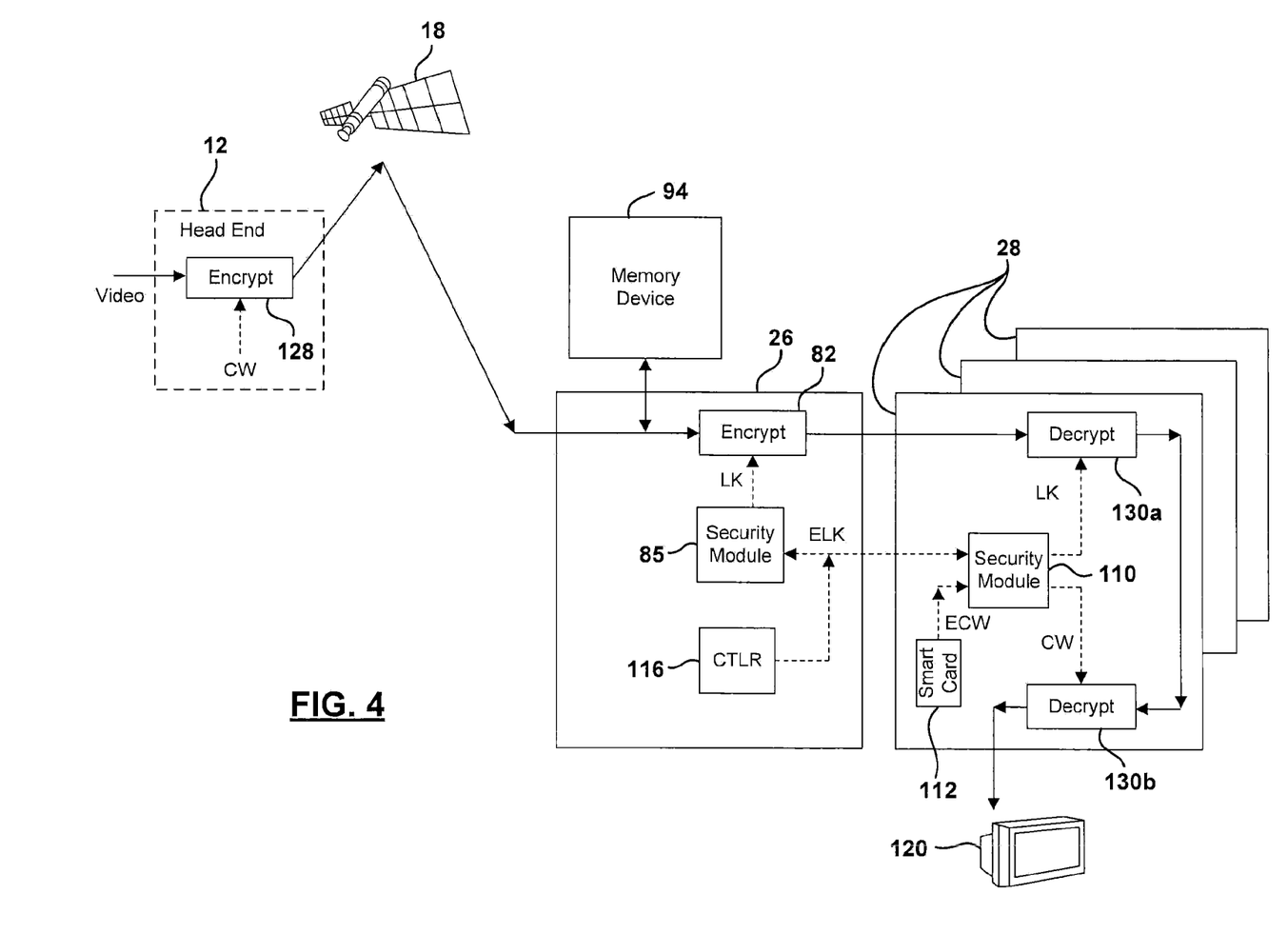
FIG. 4 is a simplified block diagrammatic illustration of a second example of a content delivery system.

Referring now to FIG. 4, a multiple dwelling unit application may use the following embodiment. In this embodiment, each user device gains access to programming based on individual subscriptions and pay-per-view purchases. The broadcast encrypted signals received from the head end 12 are not decrypted at the gateway 26, but are provided for each user device 28 to perform the broadcast decryption. As a further optional security measure, the gateway may provide an additional encryption of the signals using a local key, so that the broadcast decryption may not be provided until the signals to each of the individual user devices are first decrypted with the local key. The local key is provided to authorized users. A list of authorized users may be communicated from the head end 12 to the gateway 26. This list may include channel or content permissions for each of the various user devices 28. The list may also include encrypted information that allows the gateway 26 and user devices 28 to obtain the local keys.

Thus, the memory 94 receives and stores signals broadcasted to the gateway 26 with the broadcast encryption thereon. When a user device 28 requests particular content stored within the memory device 94, the encryption module 82 encrypts the signals with a local key generated from the security module 85. An encrypted local key (ELK) may be communicated to the security module 110 to obtain the local key at the user device. Further, a smart card or access card 112 may be used to generate an encrypted control word that is decrypted at the security module 110. Thus, each user device includes two decryption modules 130A, 130B. Decryption module 130A first decrypts the twice-encrypted signals with the local key. Decryption module 130B further decrypts the first decrypted signal with a second decryption using the control word from the security module 110. Thus, the decryption module 130A first decrypts the signal back into its broadcast encrypted format where the decryption module 130B converts the signal to an unencrypted signal.

Figure 5:
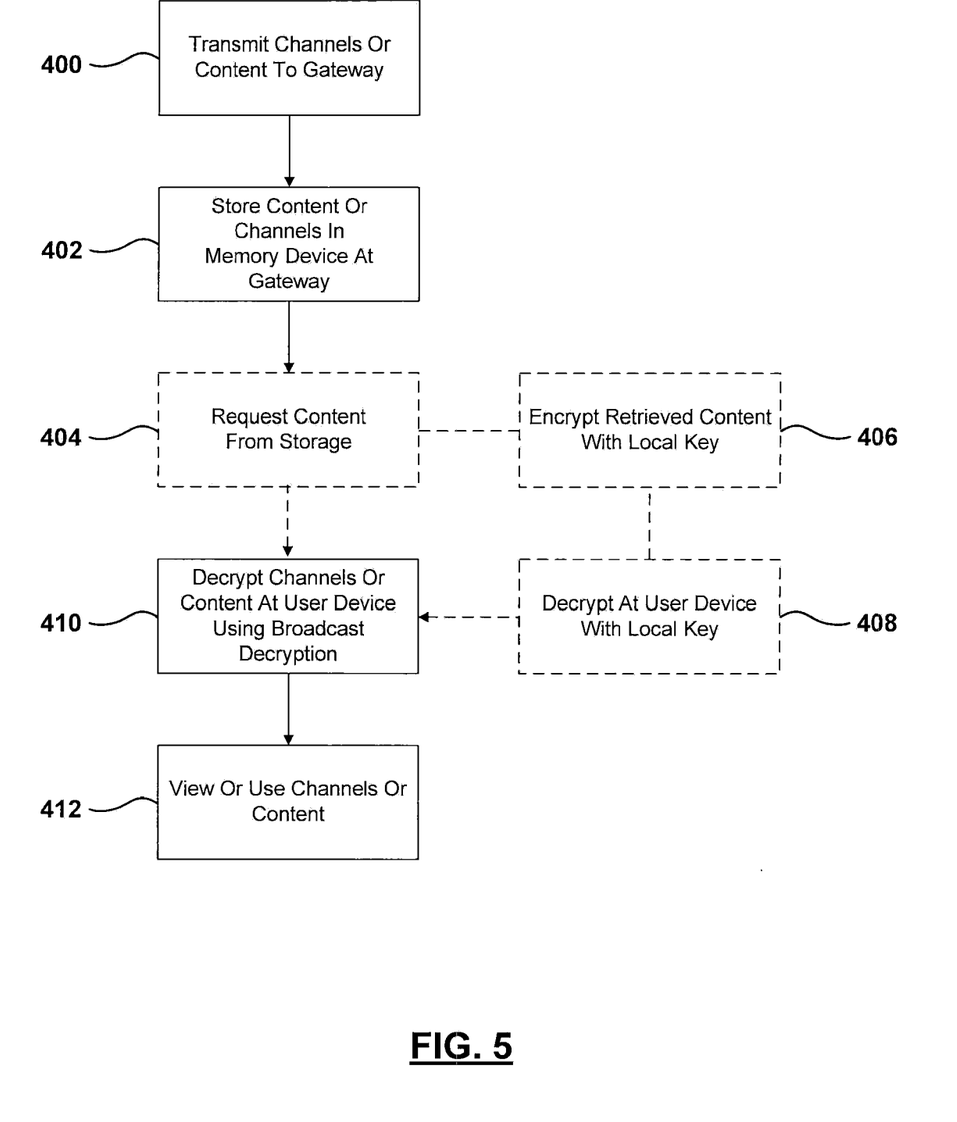
FIG. 5 is a flowchart of a second example for a method of operating the present disclosure.

Referring now also to FIG. 5, the operation of FIG. 4 is set forth in a flowchart format. In step 400, the channels or content are transmitted using broadcast encryption to the gateway. In step 402, the content or channels are stored with the broadcast encryption in the memory device 94 at the gateway. In step 404, a request for content from the storage device may be received from the user device. In step 406, the signal retrieved from the storage device is encrypted with the local key at the gateway. In step 408, the user device may decrypt the signal received from the gateway with decryption based upon the local key. Steps 406 through 408 may be optional steps in certain implementations. In step 410, the user device may decrypt the requested channels or content at the user device using broadcast decryption derived from the control word. In step 412, the unencrypted channels or content may be viewed by the display 120.

Figure 6:
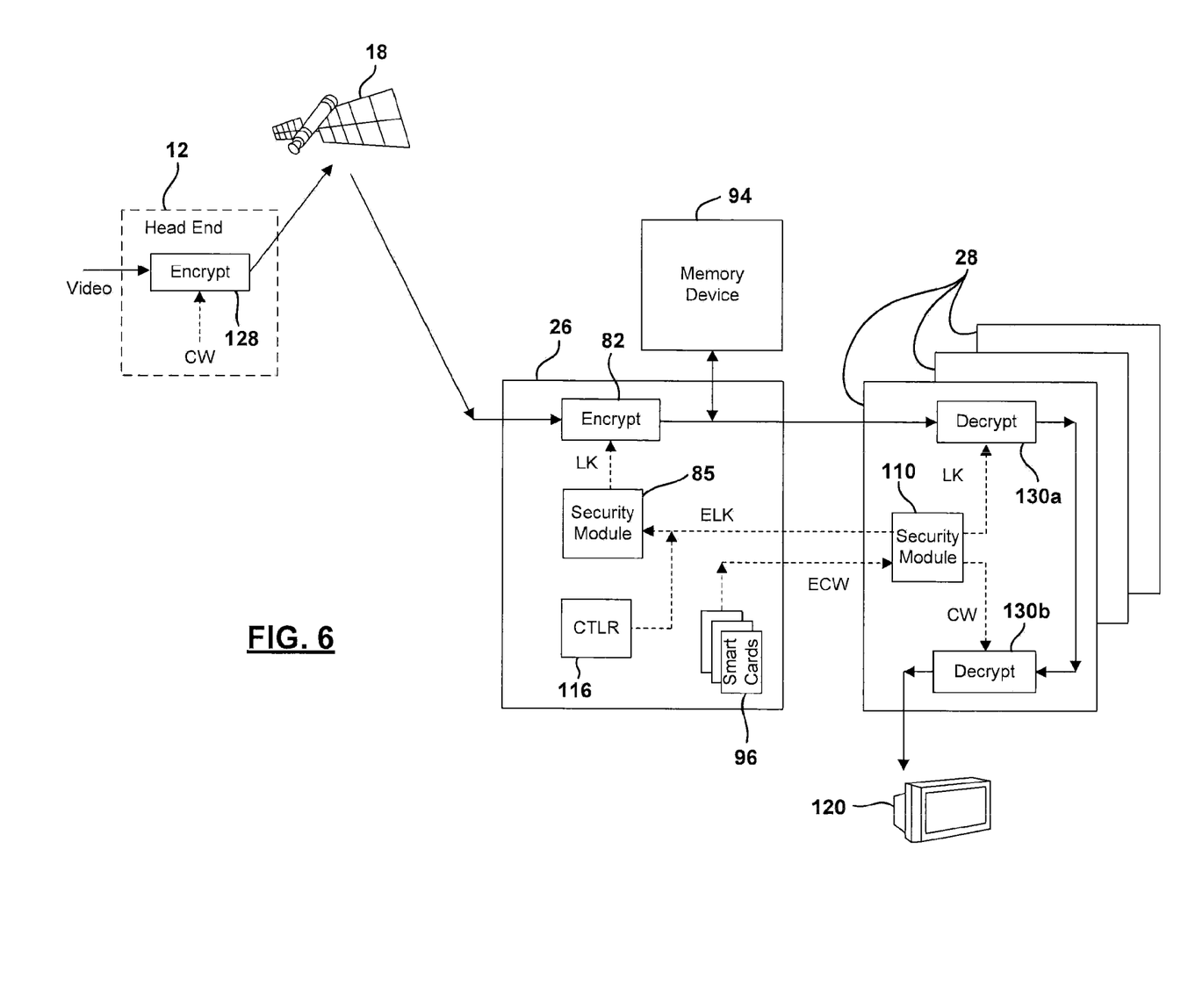
FIG. 6 is a simplified block diagrammatic illustration of a third example of a content delivery system

Referring now to FIG. 6, another embodiment that may be used for a multiple dwelling unit or an SMATV application is set forth. In this embodiment, the memory device 94 may act as a digital video recorder for each of the individual user devices. In this embodiment, the memory device may be partitioned to provide each of the user devices access to individual content. Each of the user devices will thus act as if it has its own personal hard drive or storage device. This embodiment also provides for a start-over or catch-up capability since a multitude of satellite channels may be received and stored on the hard drive providing a virtual review buffer for any channel to which a client or user device may wish to tune. Trick features, normally available on a DVR, may be available. Such trick features may include a forward fast, rewind, and pause functions.

In this embodiment, broadcast encrypted signals are provided through the satellite 18 to the gateway 26. The gateway 26 further encrypts or super-encrypts the encrypted signals. The encrypted signals may be encrypted using a local key derived from the security module 85 within the gateway 26. The security module 85 provides the local key to the encryption module 82 which super-encrypts the broadcast signal. The super- or twice-encrypted signals may be stored in the memory device 94. The security module 85 also generates an encrypted local key that is provided to the security module 110. The access cards 96 generate control words that are communicated as encrypted control words from the gateway 26 to the user devices 28. In this embodiment, two decryption modules 130A and 130B are provided within the user devices 28. This embodiment is similar to that shown in FIG. 4 that also includes two decryption modules. Therefore, the decryption modules have been given the same reference numerals. The decryption module 130A decrypts the local key encrypted signal from the memory device 94 after receiving content corresponding to a request. Output of the decryption module 130A is a broadcast-encrypted signal that is further decrypted in decryption module 130B using the control word received from the security module 110. The security module 110 receives the control word that is derived from the encrypted control word that is provided from the access cards 96 in the gateway 26.

Figure 7:
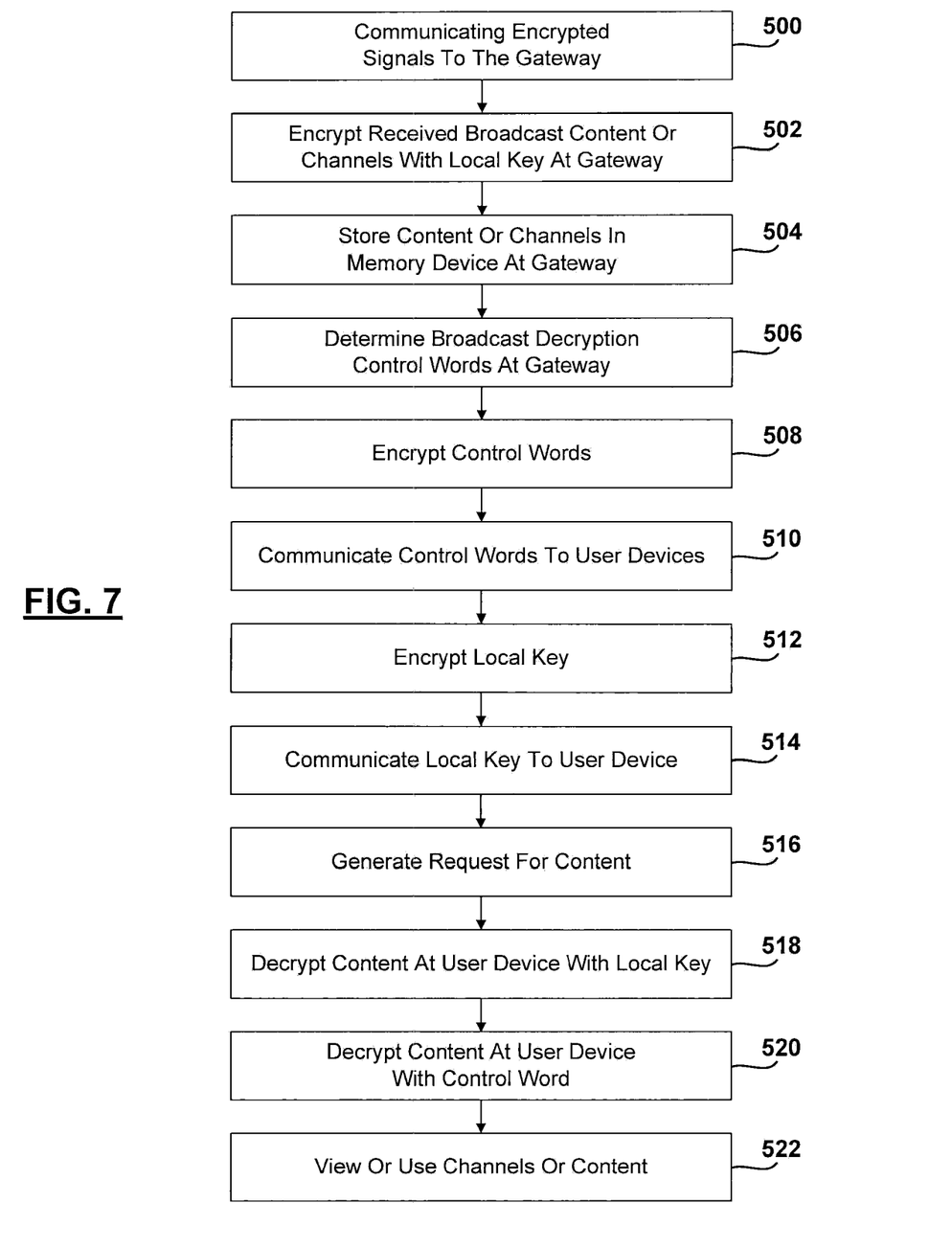
FIG. 7 is a flowchart of a third example for a method of operating the present disclosure.

Referring now also to FIG. 7, step 500 communicates encrypted signals to the gateway. In step 502, the encrypted signals with the broadcast encryption are received and encrypted with a local key at the gateway. In step 504, the content is stored in the memory device 94 at the gateway 26. In step 506, broadcast encryption control words are determined. In step 508, the control words are encrypted. In step 510, the encrypted control words are communicated to the user device. In step 512, the local key is encrypted at the security module 85 and also communicated to the security module 110. In step 514, the encrypted local key is communicated to the user device 28.

In step 516, a request for content is generated at the user device. The request for content is communicated to the gateway 26 and content from the memory device 94 is provided to the user device 28. In step 518, the content is decrypted using the local key. In step 520, the content is decrypted again using the control word. In step 522, the decrypted content may be viewed at the display 120.

In the above, it should be recognized that a request for content may be generated in various manners using the various controls on a set top box such as a remote control or the like. As is illustrated above with the various embodiments, decryption and encryption may be provided at various locations and various schemes depending on the desired security for the system. The local keys or encrypted local keys may also be distributed from the head end 12 and delivered through the satellite 18. It should be noted that the satellite 18 and the embodiments may also include the use of a communication or terrestrial network 50 illustrated in FIG. 1. Various types of "push" content may be stored in the memory device. Thus, once a particular video-on-demand title or other content is stored in the storage device for a first user, a second user may also access the stored content without having to have the content downloaded from the head end or content source. This allows the system to operate more efficiently. This also makes the system more cost-effective. Also, by providing a common storage device, the overall cost of providing the system may also be reduced since only one larger storage device, rather than a number of smaller devices, may be provided. In each of the embodiments, the same content or different content stored in the memory device 94 may be accessed by the various user devices.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a communication system comprising:
   communicating content signals to a gateway through one of a satellite or a terrestrial network;
   storing the content signals in a memory associated with the gateway;
   generating a request for content from a first user device of a plurality of user devices to the gateway;
   communicating an encrypted local key to the first user device from the gateway;
   decrypting the encrypted local key at the first user device to form a local key; encrypting a first content signal at the gateway with the local key to form a first encrypted content signal;
   communicating the first encrypted content signal to the first user device from the memory associated with the gateway in response to the request;
   decrypting the first encrypted content signal with the local key at the user device;
   generating a plurality of return signals from the plurality of user devices; and
   aggregating the plurality of return signals at the gateway to form an aggregate signal and communicating the aggregate signal to a head end.

2. A method as recited in claim 1 further comprising prior to communicating the content signals, encrypting the content signals.

3. A method as recited in claim 1 wherein encrypting a first content signal comprises encrypting the first content signal and storing the first encrypted content signal in the memory associated with the gateway.

4. A method as recited in claim 1 further comprising encrypting the local key at the gateway to form the encrypted local key.

5. A method as recited in claim 1 further comprising receiving the encrypted local key at the gateway.

6. A method as recited in claim 1 wherein decrypting the first encrypted content signal comprises decrypting the first encrypted content signal at the user device in response to the local key and a control word.

7. A method as recited in claim 1 wherein decrypting the first encrypted content signal comprises decrypting the first encrypted content signal at the user device in response to the local key and a control word generated at the user device.

8. A method as recited in claim 1 wherein decrypting the first encrypted content signal comprises decrypting the first encrypted content signal at the user device in response to the local key and a control word generated at the gateway.

9. A method as recited in claim 1 further comprising generating a second request for content from a second user device from the plurality of user devices and communicating the first content to the second user device from the memory in response to the second request.

10. A method as recited in claim 1 further comprising generating a second request for content from a second user device from the plurality of user devices and communicating a second content to the second user device from the memory in response to the second request, said second content different than the first content.

11. A method of operating a communication system comprising:
    encrypting a plurality of signals with broadcast encryption to form a plurality of encrypted signals;
    communicating the plurality of encrypted signals to a system gateway through one of a satellite or a terrestrial network;
    storing the encrypted signals in a memory device at the gateway; generating a request for content for a first signal of the plurality of encrypted signals stored in the storage device memory from a first user device of the plurality of user devices;
    communicating an encrypted local key to the first user device from the gateway; decrypting the encrypted local key at the first user device to form a local key;
    encrypting a first content signal at the gateway with the local key to form a first encrypted content signal;
    communicating the first encrypted signal to the first user device from the memory of the gateway;
    decrypting the first signal with the local key at the first user device to form unencrypted signals;
    generating a plurality of return signals from the plurality of user devices;
    aggregating the plurality of return signals at the gateway to form an aggregate signal; and
    communicating the aggregate signal to a head end.

12. A method as recited in claim 11 wherein the first signal comprises a channel signal.

13. A method as recited in claim 11 wherein the first signal comprises a content signal.

14. A method as recited in claim 11 further comprising generating a second request for content from a second user device from the plurality of user devices and communicating the first content to the second user device from the memory in response to the second request.

15. A method as recited in claim 11 further comprising generating a second request for content from a second user device from the plurality of user devices and communicating a second content to the second user device from the memory in response to the second request, said second content different than the first content.

16. A communication system having a head end generating a plurality of content signals comprising:
    a plurality of user devices comprising at least a first user device; and
    a system gateway in communication with the head end and the plurality of user devices, said system gateway comprising a memory, said system gateway receiving the plurality of content signals from the head end through one of a satellite or a terrestrial network and storing the plurality of content signals in the memory, said system gateway communicating an encrypted local key to the first user device;

the first user device of the plurality of user devices generating a request for content to the system gateway and decrypting the encrypted local key to form a local key;

said system gateway encrypting a first content signal with the local key to form a first encrypted content signal and communicating the first encrypted content signal to the first user device from the memory in response to the request;

said first user device decrypting the first encrypted content signal with the local key;

said plurality of user devices generating a plurality of return signals; and said system gateway aggregating the plurality of return signals to form an aggregated signal and that communicates the aggregated signal to the head end.

17. A system as recited in claim 16 wherein the system gateway generates the encrypted local key.

18. A system as recited in claim 16 wherein the first user device decrypts the encrypted signal in response to the local key and a control word.

19. A system as recited in claim 16 wherein the user device decrypts the encrypted signal in response to the local key and a control word generated at the user device.

20. A system as recited in claim 16 wherein the user device decrypts the encrypted signal in response to the local key and a control word generated at the system gateway and transmitted to the user device.

21. A system as recited in claim 16 further comprising a second user device from the plurality of user devices generating a second request for content and wherein said gateway communicates the first content to the second user device from the memory in response to the second request.

22. A system as recited in claim 16 further comprising a second user device from the plurality of user devices generating a second request for content and wherein the gateway communicates a second content to the second user device from the memory in response to the second request, said second content different than the first content.

23. A system as recited in claim 16 wherein the plurality of user devices comprises multiple dwelling unit devices and the gateway comprises a multiple dwelling unit gateway.

24. A system as recited in claim 16 wherein the system gateway and the plurality of user devices are disposed within a multiple dwelling unit.

\* \* \* \* \*